United States Patent [19]
Kharas et al.

[11] Patent Number: 5,877,106
[45] Date of Patent: Mar. 2, 1999

[54] STABILIZED CRYSTALLINE ALUMINA COMPOSITIONS

[75] Inventors: Karl C. C. Kharas, Tulsa, Okla.; Roy T. Mitsche, Peoria, Ariz.; Heinz J. Robota, Tulsa, Okla.; Michael G. Gatter, Elk Grove Village, Ill.

[73] Assignee: ASEC Manufacturing

[21] Appl. No.: 778,668

[22] Filed: Jan. 3, 1997

[51] Int. Cl.⁶ ................................. C04B 35/10
[52] U.S. Cl. ................... 501/127; 501/128; 501/153; 423/601; 423/617; 423/618; 423/625; 423/329.1
[58] Field of Search .................... 501/127, 128, 501/153; 502/235, 238, 263, 351, 355, 500, 208; 423/328.2, 329.1, 600, 601, 617, 618, 625

[56] References Cited

U.S. PATENT DOCUMENTS

| | | | |
|---|---|---|---|
| 4,013,590 | 3/1977 | Buonomo et al. | 502/263 |
| 4,286,990 | 9/1981 | Kleinschmit et al. | 501/127 |
| 4,567,029 | 1/1986 | Wilson et al. | 502/208 |
| 4,686,093 | 8/1987 | Flanigen et al. | 502/208 |
| 4,891,197 | 1/1990 | Derouane et al. | 423/601 |
| 5,015,615 | 5/1991 | Deller et al. | 502/355 |
| 5,449,389 | 9/1995 | Yoshizumi et al. | 501/127 |

FOREIGN PATENT DOCUMENTS

| | | |
|---|---|---|
| 519303 | 3/1978 | Australia . |
| 0514229 | 11/1992 | European Pat. Off. . |
| 0560437 | 9/1993 | European Pat. Off. . |
| 0597738 | 5/1994 | European Pat. Off. . |
| 2697831 | 5/1994 | France . |
| 2702206 | 9/1994 | France . |

*Primary Examiner*—Michael Marcheschi
*Attorney, Agent, or Firm*—Kuffner & Associates

[57] ABSTRACT

New thermally- and hydrothermally-stable δ-alumina compositions stabilized with an oxide of silicon, germanium, phosphorus, arsenic or a mixture thereof and methods of preparation of same are provided. Also provided are catalyst supports and catalysts made using these stabilized δ-alumina compositions, methods for making same, and methods for treating the exhaust gas from an internal combustion engine using such catalysts.

8 Claims, 11 Drawing Sheets

0.1 wt% P-containing $P_2O_5$-$\delta$,$\theta$-$Al_2O_3$ 0.5 wt% P-containing $P_2O_5$-$\delta$-$Al_2O_3$ 1.0 wt% P-containing $P_2O_5$-$\delta$-$Al_2O_3$

STABILIZED CRYSTALLINE ALUMINA COMPOSITIONS

BACKGROUND OF INVENTION

1. Field of the Invention

The present invention relates to novel crystalline alumina compositions and methods of making the compositions, to articles made from the compositions, and to catalyst systems and methods utilizing the compositions. In another aspect, the present invention relates to novel thermally and hydrothermally stable, substantially phase-pure, crystalline alumina compositions that are similar, if not identical to, δ-alumina compositions, to methods of making the compositions from boehmite or pseudo boehmite, and to catalyst supports made from such compositions.

2. Description of the Related Art

Gaseous waste products resulting from the combustion or incomplete combustion of hydrocarbonaceous fuels, such as gasoline and fuel oils, generally include carbon monoxide, hydrocarbons and/or nitrogen oxides. These waste products pose a serious health problem with respect to pollution of the atmosphere. Sources of such gases include exhaust from stationary engines, industrial furnaces, and vehicle engines.

The amount of waste products in such exhaust gases must generally be removed to levels established by government environmental regulations. Typically, this is done by placing in the exhaust stream catalysts which are capable of removing carbon monoxide, hydrocarbons and nitrogen oxides at the same time.

Such catalysts for treating such exhaust gases are well known in the art. More specifically, these catalysts contain platinum, palladium and/or rhodium and are known as three-way catalysts, and may also include other stabilizers and promoters to improve the activity of these catalysts. However, these catalysts have characteristically tended to lose surface area or become otherwise unstable over time and extended use, particularly at high temperatures, i.e., those above about 1000° C.

For the past twenty years or so, tightening environmental regulations have provided the incentive to improve the performance of such engine exhaust catalysts. The art is replete with numerous patents and articles directed toward such catalysts. However, in spite of the number of prior art catalyst systems, there is a never-ending search for improving catalyst technology, particularly for catalyst systems that are thermally and hydrothermally stable.

For example, there is a need in the art for a δ-alumina composition that is stable against loss of surface area and phase integrity when exposed to repeated and/or extended use at temperatures in excess of 1000° C.

There is also a need in the art for engine exhaust catalyst supports made from a thermally stable δ-alumina composition. Another need in the art is for a catalyst system having at least one catalytically active component on a thermally stable δ-alumina composition. Still another need in the art is for a method of purifying automotive and other engine exhausts utilizing a catalyst system having an active component on a thermally stable δ-alumina composition.

That these and other needs in the art have been met by this invention will become apparent to those of skill in the art upon review of this specification.

SUMMARY OF THE INVENTION

The present invention provides for a thermally and hydrothermally stable substantially phase-pure crystalline alumina composition, and methods of making such alumina.

It is a feature of the present invention to provide for catalyst supports made from a unique thermally and hydrothermally stabilized crystalline alumina composition, and methods of making such supports.

It is another feature of the present invention to provide for catalyst systems having one or more catalytically active components on supports comprising stabilized substantially phase-pure crystalline alumina compositions.

It is still another feature of the present invention to provide a method of catalyzing automotive and other engine exhausts utilizing catalyst systems having one or more catalytically active components on a stabilized alumina composition support.

According to one embodiment of the present invention there is provided a thermally and hydrothermally stabilized crystalline alumina composition comprising from about 85 to about 99 percent alumina, with the remainder being a modifying stabilizer selected from the group consisting of the oxides of germanium (Ge), phosphorus (P), silicon (Si), and arsenic (As) and mixtures thereof. The alumina composition is substantially phase-pure and has a characteristic X-ray diffraction pattern containing essential peaks at the d-spacings and with the relative intensities appearing in Table 1, below. The intensity abbreviations "vs", "s", "m", "w", and "vw" represent "very strong", "strong", "medium", "weak", and "very weak". The intensity ratios corresponding to these abbreviations appear in Table 2. In addition, there appear to be no resolved reflections centered at or about d=1.914 Å or 2.86 Å.

In the tables below, $I/I_o$ is the relative maximum intensity of an X-ray diffraction reflection and is defined as follows:

$$I/I_o = 100 \times (\text{maximum intensity of a reflection})/(\text{maximum intensity of the most intense reflection}).$$

Intensities are uncorrected for background.

TABLE 1

Essential X-Ray Diffraction Reflections

| d,Å | $I/I_o$ |
|---|---|
| 2.770–2.795 | w–m |
| 2.712–2.738 | m |
| 2.580–2.608 | m |
| 2.440–2.467 | s |
| 2.295–2.315 | m |
| 2.268–2.290 | m |
| 2.148–2.162 | vw |
| 1.979–1.996 | s |
| 1.941–1.950 | m |
| 1.400–1.407 | s |
| 1.388–1.394 | vs |

TABLE 2

Intensity Level Abbreviations

| $I/I_o$ | Abbreviations |
|---|---|
| 0–14 | vw |
| 15–30 | w |
| 31–49 | m |
| 50–84 | s |
| 85–100 | vs |

According to another embodiment of the present invention there are provided methods of making substantially phase-pure crystalline alumina compositions having the characteristic X-ray diffraction pattern within the values set forth in Table 1 and characterized in being thermally and hydrothermally stable at temperatures up to about 1250° C. against changes in crystalline phase structure and/or surface area. These methods include the improvement which comprises contacting the boemite and/or pseudo-boehmite prior to calcining with a suitable oxide precursor, preferably selected from the group consisting of precursors of the oxides of germanium (Ge), silicon (Si), phosphorus (P), arsenic (As), and mixtures thereof, under conditions sufficient to thoroughly mix an effective amount of said oxide precursor with the boemite and/or pseudo-boehmite. In a first method, boehmite or pseudo-boehmite is heated at temperatures in excess of about 300° C. in a water-containing atmosphere in a silicon-containing glass-lined (e.g., Pyrex) autoclave. The temperature and pressure conditions in the autoclave should be such that a measurable amount of silicon (probably in the form of silicic acid) from the glass liner is solubilized and contacts the alumina.

A second method generally includes contacting boehmite or pseudo-boehmite with a suitable amount of water and a modifying stabilizer at a temperature of at least 150° C., and a pressure of at least 70 psig, for a contacting time of at least 2 hours.

A third method comprises mixing boehmite or pseudo-boehmite with a suitable amount of water and an amount of one or more certain modifying stabilizer compounds at atmospheric pressure for a period of at least 20 minutes, and then separating the water from the boehmite/modifying stabilizer mixture.

The methods of this embodiment further include calcining at a temperature of at least 900° C. for at least 2 hours in order to fully convert the boehmite or pseudo-boehmite to the crystalline alumina having the substantially pure phase structure and the characteristic X-ray diffraction values shown in table 1 that is similar, if not identical, to the phase heretofore referred to as "delta".

According to even another embodiment of the present invention there are provided articles, such as catalyst supports. These articles are made from a stabilized phase-pure crystalline alumina composition containing an effective amount of a modifying stabilizer selected from the group consisting of the oxides of germanium (Ge), phosphorus (P), silicon (Si), and arsenic (As) and mixtures thereof. Based on the combined weight of the modifying stabilizer and the alumina, the support will generally comprise from about 85 to about 99 weight percent alumina with the balance being modifying stabilizer.

DETAILED DESCRIPTION OF THE INVENTION

Figure 1:
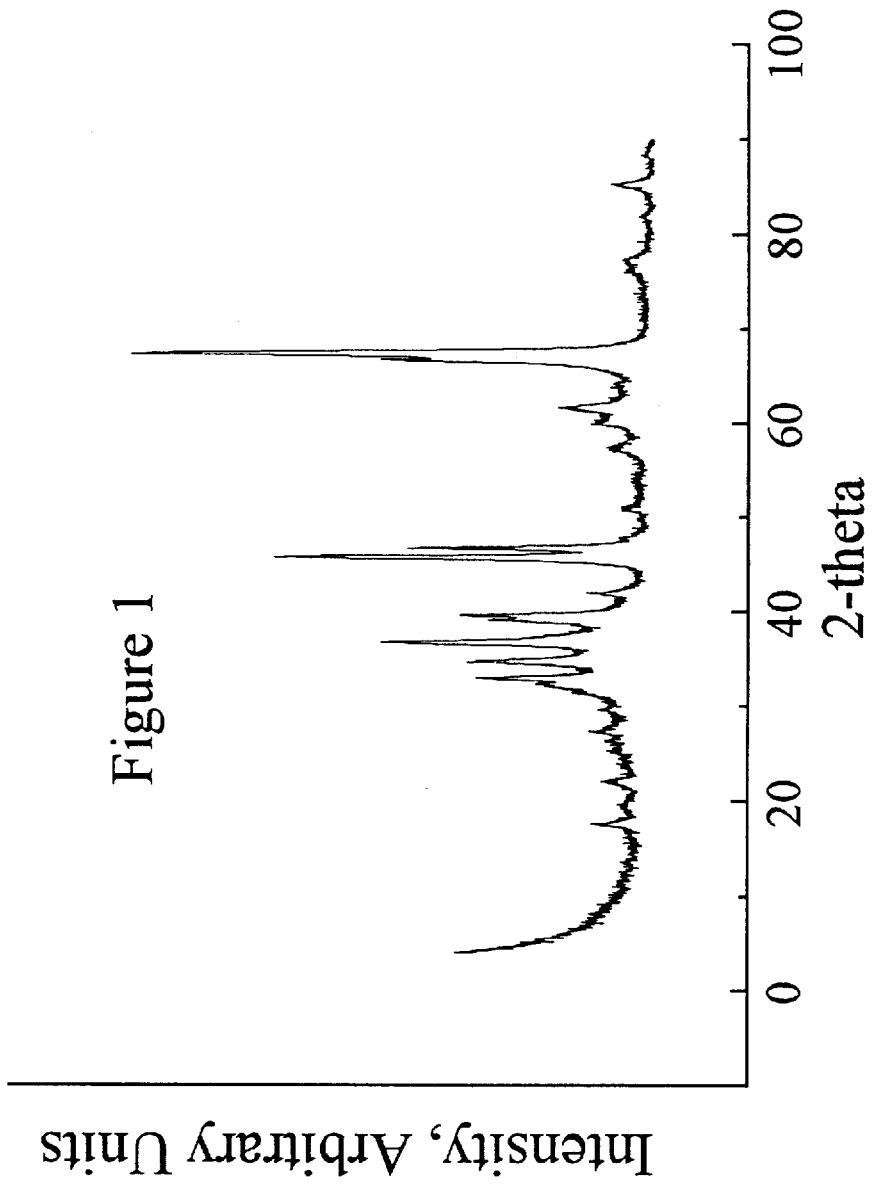
FIG. 1 is a typical X-ray diffraction pattern of a stabilized alumina composition characteristic of the present invention. The X-ray diffraction pattern shown is that of a crystalline alumina composition stabilized with 5.6 wt. % $SiO_2$ that has been hydrothermally treated at 1100° C. The pattern is similar to but noticeably different from the standard X-ray diffraction pattern for δ-alumina, as published by JCPDS (file # 16-394).

According to the present invention, a thermally and hydrothermally stable substantially phase-pure crystalline alumina composition is obtained by a method that includes first contacting a boehmite or pseudo-boehmite precursor with water in the presence of a suitable amount of modifying stabilizer, then separating the water from the stabilizer/boehmite mixture, and finally crystallizing the stabilized alumina, followed by calcining.

The contacting of the precursor material with water and stabilizing reagent is conveniently conducted at elevated pressure and temperature. If a suitable oxide reagent is employed, as discussed below, this step may be carried out at atmospheric pressure.

By "thermally stable," it is meant that alumina crystal remains essentially phase-pure even under prolonged treatment(i.e., more than about 5 hours) at temperatures greater than 1100° C. and up to about 1250° C. By "hydrothermally stable" it is meant that the crystalline alumina remains essentially phase-pure when heated in an atmosphere containing 10% by volume $H_2O$ with the balance air or another gas that is inert under the given temperature and pressure conditions.

The alumina of the present invention appears to be substantially phase-pure delta alumina, as that term has generally been understood prior to this invention. Delta alumina is generally understood to be one intermediate phase out of several along the transformation pathway between boehmite and pseudo-boehmite (which are semi-crystalline forms of AlOOH) and alpha alumina. (A pseudo-boehmite is generally described as a small crystal size boehmite that frequently contains intercalated water. Pseudo-boehmite typically occurs as nano-crystalline plates, each plate being no larger than 5 nm.) The transformation series is generally believed to be:

boehmite → γ-alumina → δ-alumina → θ-alumina → α-alumina.

The delta phase of alumina is considered to be unstable with respect to theta alumina, with the transformation typically occurring at temperatures in the range of about 850° C. to about 1050° C. While we appear to have obliterated this transformation, our material appears to transform at higher temperatures to other phases yet uncharacterized.

By "substantially phase-pure delta alumina", it is meant that there are no discernible reflections in an X-ray diffraction pattern that are typical of theta alumina and that the predominant reflections are those that are characteristic of what has heretofore been considered to be the delta phase. In addition, the composition is greater than about 90 wt. % single phase crystalline material and may be as high as about 97% by weight, depending on the starting material (the more highly crystalline the boehmite, the higher the degree of purity in the end product). Moreover, there are no discernible indications of a separate stabilizing oxide component existing outside the crystalline alumina.

Characterization by X-ray Diffraction

It should be pointed out that the reflections typical of compositions made according to the present invention do not precisely match up to the current standard for δ-alumina published by the Joint Committee on Powder Diffraction Standards (JCPDS), file # 16-394. In addition, certain reflections believed to be characteristic of the delta phase are essentially absent in our material. Specifically, there appear to be no resolved reflections centered at or about d=1.914 Å or d=2.86 Å in X-ray diffraction patterns of compositions made according to the present invention. For this reason, we sometimes refer to the crystalline materials of this invention as "stabilized-δ alumina" compositions, with the stabilizing component being identified. Thus, a composition of our invention made using silica as the stabilizing agent will be referred to as "silica-stabilized δ-alumina" or, more simply "$SiO_2$—δ—$AlO_2$". Therefore, although the crystalline alumina composition of the present invention is, at various times in the following description and examples, referred to as "δ-alumina" or "delta phase alumina", such terms, when referring to compositions of the present invention, are to be construed as a convenient way of describing the crystalline alumina composition of the present invention and are not intended to imply that these compositions are the same as δ-alumina that is generally accepted as being described by the JCPDS standard.

For example, a silica-stabilized δ-alumina composition prepared by the atmospheric pressure method of the present invention using TEOS in ethanol as the modifying-stabilizer reagent, and containing 5.6 wt. % $SiO_2$ in the product, was characterized by X-ray powder diffraction with CuKα radiation. The uncertainty in the 2θ values is about ±0.04°. The powder pattern appears in FIG. 1, and the listing appears in Table 3, below, alongside the JCPDS listing for δ-alumina.

TABLE 3

Silica-Containing and Essentially Pure δ-Alumina
X-Ray Diffraction Reflections

| $SiO_2$-δ-$Al_2O_3$ | | | δ-$Al_2O_3$(JCPDS) | | |
|---|---|---|---|---|---|
| 2θ | d,Å | $I/I_0$ | 2θ | d,Å | $I/I_0$ |
|  | absent |  | 32.01 | 2.881 | 8 |
| 32.20 | 2.778 | 21 |  | absent |  |
| 32.92 | 2.719 | 39 | 32.80 | 2.728 | 30 |
| 34.72 | 2.581 | 35 | 34.45 | 2.601 | 25 |
| 36.64 | 2.451 | 53 | 36.48 | 2.460 | 60 |
| 39.10 | 2.302 | 32 | 38.48 | 2.315 | 8 |
| 39.58 | 2.271 | 38 | 39.52 | 2.279 | 40 |
| 41.98 | 2.151 | 14 | 41.77 | 2.160 | 4 |
| 45.73 | 1.982 | 73 | 45.64 | 1.986 | 75 |
| 46.69 | 1.944 | 48 | 46.47 | 1.953 | 40 |
|  | absent |  | 47.46 | 1.914 | 12 |
| 66.73 | 1.401 | 53 | 66.37 | 1.407 | 50 |
| 67.33 | 1.390 | 100 | 66.99 | 1.396 | 100 |

The silica-stabilized δ-alumina composition illustrated in FIG. 1, which is typical of the compositions of the present invention, appears to contain essentially no θ-alumina and can be seen as essentially a phase-pure material. Importantly, no stabilizer-containing phases are observable in the diffraction pattern. The preferred modifying stabilizer reagents to be utilized in the practice of the present invention are selected from the group consisting of the oxides of germanium (Ge), phosphorus (P), silicon (Si), and arsenic (As) and mixtures of two or more of such oxides. Preferred single modifying stabilizers include $P_2O_5$, $SiO_2$ and $GeO_2$. Since, however, all of these modifying stabilizers are known to be poisons for noble metal redox catalysts, it is often advantageous to minimize the poisonous effect of any one stabilizer by employing a mixture of stabilizers, such as $GeO_2/SiO_2$, $GeO_2/P_2O_5$, or $SiO_2/P_2O_5$, in which the quantity of each individual oxide employed is below the threshold amount necessary to produce the desired stabilizing effect when that oxide is used alone.

Preparation Using a Pyrex-lined Autoclave

This method of preparation relies on the modifying stabilizer being leached from the liner of an autoclave that has been lined with a silica-containing glass such as Pyrex. As such, the method is limited in application to the preparation of a silica-stabilized δ-alumina composition. A mixture of boehmite or pseudo-boehmite and enough water to immerse the boehmite or pseudo-boehmite is placed in a Pyrex-lined autoclave and the system's temperature and pressure are raised to at least about 150° C. and at least about 70 psig and held at those conditions for a period of at least two hours. When the stabilizer is derived from a Pyrex liner, the preferred temperature is generally in the range of about 300° C. to about 375° C., more preferably, in the range of about 300° C. to about 350° C., most preferably 325° C, and the pressure is greater than 200 psig, preferably about 2400 psig. The resulting material is then calcined at between about 900° C. and about 1250° C. for between about 2 to about 4 hours.

Preparation Using a Closed System

In this method, the preferred modifying stabilizers are generally utilized in an organic form. For example, suitable types of silicon stabilizing reagents include, e.g., silicon alkoxides and organo silanes. Specific preferred silicon reagents include silicic acid ($SiO_2$.nHOH), tetraethylorthosilicate and tetramethyl ammonium silicon hydroxide. Suitable types of germanium modifiers will include the germanium alkoxides, preferably, germanium (IV) ethoxide, [Ge$(OC_2H_5)_4$], and tetramethylammonium germanium hydroxide. Suitable temperatures for contacting the boehmite or pseudo-boehmite precursor with water will depend on the method of stabilizer incorporation. When the modifying stabilizer is added separately as a reagent, the temperature can be as low as 20° C. When the contacting of the water and modifying stabilizer is to be carried out in a closed reactor, the pressure will be determined by the temperature of the system, but will generally be in the range of about 70 psig to about 2500 psig. The reaction time for contacting the precursor, water and modifying stabilizer will generally be in the range of about 2 hours to about 120 hours, primarily depending upon the temperature, with faster reactions occurring at higher temperatures. In the contacting of a boehmite or pseudo-boehmite, water and modifying stabilizer, a sufficient amount of liquid water must always be present to immerse the boehmite or pseudo-boehmite. The ratio of the boehmite or pseudo-boehmite precursor to the modifying stabilizer will depend upon the particular stabilizer utilized and the porosity of the alumina precursor. Following the contacting of the boehmite or pseudo-boehmite, water and the modifying stabilizer, modified alumina crystals are crystallized from the reaction mixture using crystallization techniques known in the art. The recovered crystals of stabilized alumina are then subjected to calcining, as is well known in the art. In the practice of the present invention, the calcining temperatures will generally be in the range of about 900° C. to about 1250° C. Preferably, the calcining temperatures will be in the range of about 1050° C. to about 1125° C. Calcining times suitable for use in the present invention are generally in the range of about 2 hours to about 12 hours. Preferably, the calcining times will be in the range of about 2 to about 8, most preferably in the range of about 4 to about 6 hours.

Preparation at Atmospheric Pressure

In general, this method involves the formation of an aqueous suspension of boehmite or pseudo-boehmite with a suitable amount of an appropriate modifying-stabilizer precursor reagent or mixture of reagents, removal of the water contained in the suspension from the boehmite or pseudo-boehmite/precursor mixture( for example, by slow drying over heat) and, thereafter, calcination of the mixture to form oxides of the precursor compounds and cause the alumina to crystallize fully to the delta phase. Optionally, the calcined material may be further treated hydrothermally to assure that there is a complete transition to the delta phase. It appears that, in the calcination process, the stabilizing oxides that are formed enter into the crystalline structure and lose their separate identity. Several modifying stabilizer precursor reagents are suitable for use in this method, with the choice of reagent being dictated by the modifying stabilizer to be employed. When $SiO_2$, $GeO_2$, or a mixture of these oxides are to be the modifying stabilizer, any tetra-alkyl ammonium silicate and/or tetra-alkyl ammonium germanate having a solubility in water greater than about 1% by weight may be employed as the reagent, with the preferred reagents being tetra-methyl ammonium silicate and tetra-methyl ammonium germanate. If the reagent is an alkoxide, it should initially be dissolved in an alcohol, preferably ethanol, prior to being mixed with the aqueous boehmite or pseudo-boehmite suspension. Silicic acid has also been found to be an effective reagent in autoclave methods for the preparation of silica-stabilized δ-alumina compositions of the present invention, and aqueous solutions of silicic acid are effective as a silicon source in atmospheric pressure procedures. When the oxides of phosphorus and/or arsenic are to be the modifying stabilizer, any water-soluble phosphate or arsenate may be employed as the reagent, with the preferred reagents being ammonium di-hydrogen phosphate, di-ammonium hydrogen phosphate, and their arsenate analogs. The P and As reagent should initially be dissolved in water prior to being mixed with the aqueous boehmite or pseudo-boehmite suspension. After mixing of the boehmite or pseudo-boehmite suspension and reagent long enough to ensure thorough mixing of the reagent and boehmite, it is necessary to separate whatever water is in the mixture from the boehmite/ reagent mixture. This may be accomplished by any method known to those skilled in the art including, but not limited to, drying, steam evaporation, and in some cases, filtration. Steam evaporation using a rotary drum dryer has been found to be particularly effective, and is preferred. It is important that when the modifying-stabilizer reagent is a phosphate, this separation of water from the mixture be accomplished in a manner that results in the phosphate remaining thoroughly mixed with the boehmite. This would usually dictate that the separation be done rapidly, such as through the use of a steam heated rotary drum dryer, to avoid having a highly water-soluble phosphate migrate from the mixture with the water. Calcining of the resultant boehmite/stabilizer mixture may be accomplished by any of the techniques known to those skilled in the art. Initial calcination for about two hours at 150° C. followed by a six-hour hold at 600° C. has been found to be effective, and is preferred. Following calcination, the stabilized crystalline alumina composition may optionally be hydrothermally treated in air containing about 10% water at about 1100° C. for about six hours. Based on the total weight of alumina and modifying stabilizer, the stabilized crystalline alumina obtained from the above processes will generally have an alumina content in the range of about 85 to about 99 weight percent, and a modifying stabilizer content in the range of about 1 to about 15 weight percent. Preferably, the stabilized alumina will have an alumina content in the range of about 90 to about 98.5, and a modifying stabilizer content in the range of about 1.5 to about 10 weight percent. Most preferably, the composition will have an alumina content in the range of about 94 to about 98.25, and a modifying stabilizer content in the range of about 1.75 to about 6.0 weight percent, depending primarily on the relative atomic weight of the stabilizer(s) used.

To achieve stabilized crystalline alumina compositions that are substantially phase-pure, it has been found that the $SiO_2$ and/or $GeO_2$ content of the composition must be above about 1.75 wt. % of the combined alumina and stabilizer components. If oxides of phosphorus or arsenic are employed as modifying stabilizer, the $P_2O_5$ and/or $As_2O_5$ content must be a minimum of about 1 wt. %.

The crystalline phase-pure stabilized alumina compositions of the present invention are particularly suitable for use in making catalyst supports, especially for catalysts that are to be exposed to high temperatures, e.g., greater than about 1000° C.,for extended periods or intermittently over an extended duration(as are experienced in automobile exhaust converters). The term "support" as used in the present disclosure refers to the substrate on which the catalytically active material (generally one or more group VIII metals or transition metal oxides), and any optional promoters, are deposited.

The stabilized alumina composition supports of this invention may be used in any suitable form, as will be understood by those skilled in the art. However, it is preferred that they be used in pelleted form or, most preferably, in the form of a powdered material which is deposited (e.g., as a "washcoat") on an inert structure, such as a honeycomb monolith made of ceramics or metal, as will be familiar to those skilled in the art.

The crystalline phase-pure stabilized alumina composition supports of the present invention can also include minor amounts of other traditional supports, including, without limitation, other aluminas (γ, delta, theta, α, etc.), silica, silica-alumina, zirconia, titania, barium-containing alumina, other rare earth oxides, and mixtures thereof, and molecular sieves and zeolites, including faujasite, MFI, mordenite, beta, ferrierite, and the like.

Typically, the supports of this invention will have a BET surface area of about 25 to about 150 $m^2$/gm. For use as a washcoat with monoliths, the alumina support will preferably have an average particle size in the range of about 0.5 $\mu$m to about 10 $\mu$m. Such powdered alumina will have the catalytically active material, and optionally the promoters, deposited on them either before or after the alumina is coated on the monolith. Alternatively, a particulate support with a suitable surface area could have the catalytically active metals deposited directly on it.

The supports of the present invention can also be combined with performance enhancing components, such as promoters and activators, as is known in the art. Such components such as the alkaline earth oxides, including barium and strontium, transition metals, including iron, nickel and manganese, and rare earth oxides including ceria and lanthanum, have been found useful. Preferably, promoters such as ceria and other rare earth metals, such as lanthanum, samarium, and gadolinium, are employed as crystallites having smaller than usual size, particularly below 50 Å. Specific non-limiting examples of performance-enhancing components that are advantageously added to the supports of the present invention include $La_2O_3$, $BaSO_4$, $BaCO_3$, $BaO$, $CeO_2$, Ce/Zr mixed metal oxides, $KCO_3$ and $LiCO_3$. A benefit of combining the supports with performance-enhancing components is that the enhancements are maximized due to the very fine surface area of the aluminas employed and this effect continues through repeated and prolonged exposure to the very high temperatures at which the enhancements have their greatest value.

Promoters and activators may be combined with the supports of the present invention according to methods familiar to those skilled in the art, preferably by solution impregnation using compounds which can be decomposed by heat to produce their oxides. Examples of such compounds include the halides, nitrates, and acetates, preferably acetates. After cacining at a temperature of about 500° C. to about 700° C. for about 1 to 12 hours, the promoter elements will be present as their metal oxides. The promoters can also be applied as solutions which include compounds comprising hydroxy and/or carboxylic acid groups, such as have been found useful for depositing ceria.

Catalytically active materials for catalyzing exhaust and other hydrocarbon-containing gases are well known to those of skill in the art. The exact selection of catalytically active materials to be deposited on the supports of the present invention will depend upon the end use of the catalyst system. Non-limiting examples of catalytically active materials suitable for use with the supports of the present invention include at least one metal selected from the group consisting of cobalt (Co), copper (Cu), gold (Au), iridium (Ir), nickel (Ni), palladium (Pd), platinum (Pt), rhodium (Rh), ruthenium (Ru), and tungsten (W). Preferable pairs of catalytically active materials suitable for use in the present invention include platinum in combination with cobalt (Co), copper (Cu), gold (Au), silver (Ag), iron (Fe), nickel (Ni), palladium (Pd), and rhodium (Rh), with Pt—Rh, Pt—Ag and Pt—Au especially preferred. A preferred multi-member combination of catalytically active materials is Pt—Rh—Co.

Methods of depositing catalytically active materials onto a support are well known to those of skill in the art. In the practice of the present invention, the deposition method is not critical, and any suitable method may be utilized. A common method for depositing catalytically active materials on the support includes rotary steam evaporation of a transition metal coordination complex followed by calcination. Where noble metals are utilized as the catalytic material, it is preferred to apply them to the stabilized δ-alumina composition supports by decomposing a noble metal compound which has been deposited directly on the support.

EXAMPLES

Example 1

Essentially pure delta phase alumina was synthesized by heating in a glass-lined (Pyrex) autoclave wet washed oil dropped spheres in an aqueous atmosphere at a temperature in the range of 340° C.±10° C. and pressure of 2200 psig±200 psig for a period of 6 hours. The autoclaved product was then oven dried, ground through 40 mesh and calcined for 2 hours at 1200° C. in a muffle furnace.

The spheres were prepared from alumina chloride hydrosol having an Al/Cl weight ratio of 0.78 and a 11.98 weight percent Al content. Pressure aging at 120° C. for 1.5 hours, followed by water washing, was used to obtain the autoclave feed.

As a comparative example, a portion of the autoclave feed material was used as a comparison sample prepared without the autoclaving treatment (Sample No. 4). All other treatments remained the same.

The results are presented in the following Table 4.

TABLE 4

| Sample Number | Autoclave Temperature Treatment | Calcination Temperature Treatment | Alumina Phase | Surface Area ($m^2/g$) | Pore Volume (ml/g) | Pore Radius (Å) |
|---|---|---|---|---|---|---|
| 1 | N/A | 1200° C. 2 hrs | delta | 35 | N/A | N/A |
| 2 | N/A | 1200° C. 2 hrs | delta | 49 | N/A | N/A |
| 3 | 345° C. | 1200° C. 2 hrs | delta | 40 | 0.28 | 138 |
| 4 | none | 1200° C. 2 hrs | alpha | 12 | 0.05 | 81 |
| 5 | 335° C. | 1200° C. 6 hrs | delta | 36 | 0.32 | 78 |
| 6 | 335° C. | 1200° C. 2 hrs | delta | 43 | 0.24 | 57 |
| 7 | 342° C. | 1200° C. 2 hrs | delta | 37 | 0.18 | 50 |

Example 2

A $Pt/SiO_2$—δ—$Al_2O_3$ catalyst precursor was made by covering 60 grams of a $SiO_2$—δ—$Al_2O_3$ support material made according to the procedure of Example 1 with about 200 grams deionized water containing 1.2 grams Pt as Pt nitrate. After rotary steam evaporation, a portion of the catalyst precursor was treated in flowing 10% $H_2O$/90% $N_2$ in a horizontal tube furnace at 1100° C. for 6 hours. After cooling, a sample of about 2.5 grams from the treated portion was situated in a quartz reactor and simulated exhaust gas was caused to pass over the catalyst at a rate of 5 liters/minute. The gas contained 700 ppmv propene, 700 ppmv NO, 7.5% $O_2$, 20 ppmv $SO_2$, 300 ppmv CO, 10% $H_2O$, 10% $CO_2$, balance $N_2$. The temperature at the catalyst inlet was increased from 100° C. to 700° C. at a rate of 7° C./minute. The catalyst exhibited an onset of $NO_x$ conversion at about 200° C. and attained a maximum $NO_x$ conversion of about 45% at 225° C. At temperatures between 225° C. and about 400° C., $NO_x$ conversion gradually declined to 0% conversion. This catalyst was subjected to treatment in the same simulated exhaust gas at 700° C. for 51 hours. $NO_x$ reduction conversion performance was assessed after 1, 10, 20, 30, 40, 50 and 51 hr of aging by cooling the catalyst and conducting a temperature ramp to 700° C. in each instance. The catalyst showed no deactivation in this experiment.

In a control experiment, another portion of the catalyst precursor was treated at 960° C. in 10% $H_2O$/90% $N_2$ in a horizontal tube furnace, and thereafter submitted to a simulated exhaust gas in the same manner as stated above. Not only was fresh $NO_x$ reduction performance inferior (with an onset of $NO_x$ conversion at about 250° C. and a maximum conversion level of only about 25%), this catalyst deactivated noticeably after only 1 hour of treatment in the simulated exhaust gas at 700° C.

The ultrastable nature of the alumina used in this catalyst contributes to the durable catalytic performance obtained by treating the catalyst precursor at 1100° C. Generally, alumina supports engage substantial loss of surface area, sintering, and phase transformation at temperatures greater than about 950° C. These deleterious changes in the alumina surface tend to promote Pt agglomeration and envelopment of the Pt by the alumina, both of which are detrimental to catalyst performance as they decrease the amount of Pt available to interact catalytically with gas phase molecules.

In the following examples, $SiO_2$—$\delta$—$Al_2O_3$ is made at atmospheric pressure utilizing commercially available crystalline boehmites and commercially available silicon sources. The preparations involve an aqueous suspension that is dried by simple rotary steam evaporation in the standard double-jacketed glass evaporators, followed by high temperature treatment.

Example 3

40 grams of PURAL 400 (Condea Chemie GMBH, Tucson Ariz.) was suspended in 400 ml deionized water. In a separate beaker, 3.53 grams of $Si(OC_2H_5)_4$, tetraethylorthosilicate (TEOS) was diluted with 20 ml of ethanol. While vigorously stirring the PURAL 400 suspension with a magnetic stir bar, the TEOS/ethanol solution was gradually added dripwise. Once the addition was complete, stirring was continued for one half hour. The mixture was then dried by rotary steam evaporation. The resultant solid material was calcined for 2 hr at 150° C. and for 6 hr at 600° C. Ten grams of this material was treated in 90% air/10% steam at 1100° C. for 6 hr in quartz tube furnace. Routine X-ray diffraction data were collected.

40 grams of PURAL 400 was suspended in 400 ml deionized water. While stirring the boehmite suspension vigorously with a magnetic stir bar, 2.6 grams LUDOX AS-40 sol (E.I. Dupont de Nemours & Co., Wilmington Del.) was added. After rotary steam evaporation, the material was calcined in air at 150° C. for 2 hr and for 6 hr at 600° C. Ten grams of the resultant powder was treated in 90% air/10% steam at 1100° C. for 6 hr in quartz tube furnace. Routine X-ray diffraction data were collected. The LUDOX sol was selected since this silicon sol is stabilized by ammonium rather than sodium ions and is essentially chloride free.

Figure 2:
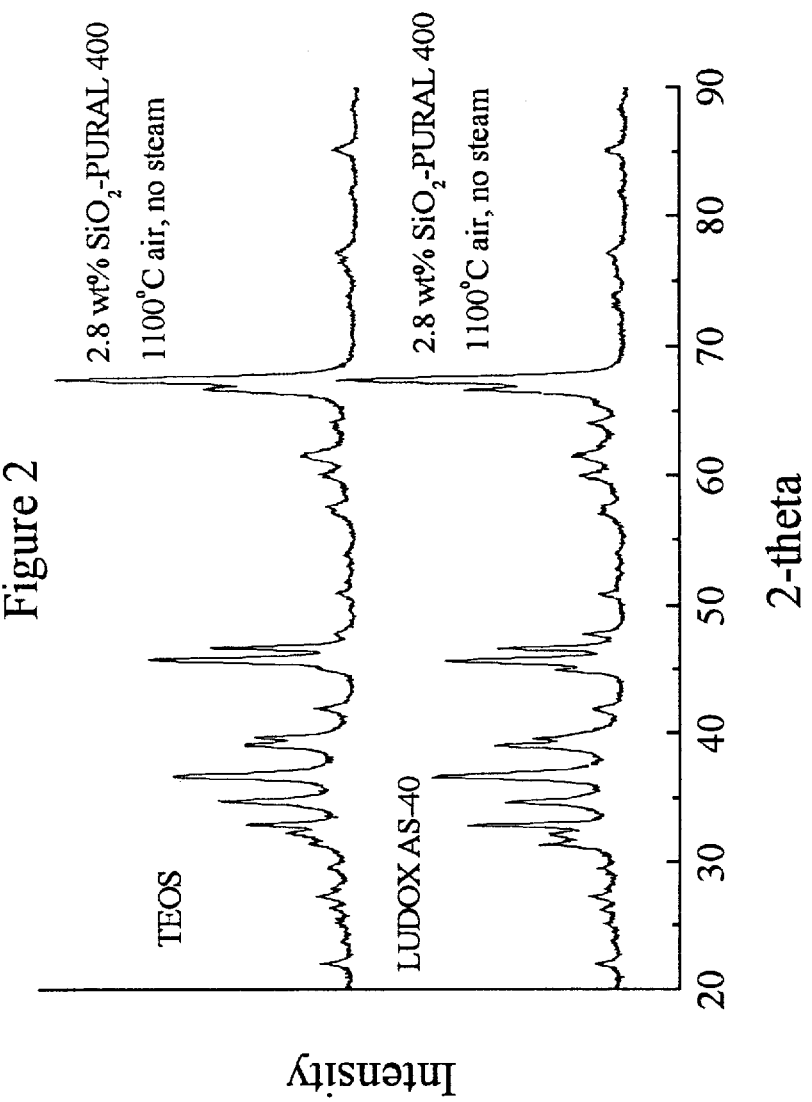
FIG. 2 shows the X-ray diffraction patterns of a silica-stabilized alumina composition prepared using TEOS as the reagent according to the present invention compared to that of a similar composition using Ludox AS-40 as the reagent.

FIG. 2 compares the diffraction patterns of alumina, containing about 2.8 wt % silicon, made using these two silicon sources, that has been treated hydrothermally in air at 1100° C. The material made using the LUDOX sol appears to contain an appreciable amount, perhaps 25%, of $\theta$—$Al_2O_3$. However, the material made using TEOS contains significantly less $\theta$—$Al_2O_3$, more than 10% but less than 25%, and is nearly phase-pure $\delta$—$Al_2O_3$. It is believed that the better results using TEOS are due to the significantly smaller particle size of the silicon, as compared to the LUDOX, which is estimated by the supplier to be in the order of about 200 Å.

Crystallinity of the $SiO_2$—$\delta$—$Al_2O_3$ increases as boehmite crystallite size increases. Less crystalline boehmites, such as PURAL 200 (8277-111B2) and DISPAL 11N7-12 (8277-113A3) (VISTA Chemical Co., Houston, Tex.) are also suitable for use in the present invention.

Example 4

Using the same procedure as Example 3, the silicon content was increased from the 2.8 wt % nominal $SiO_2$ of the initial preparations to 5.6 wt %. X-ray diffraction analysis of the products was undertaken to determine the effect of increasing the amount of silicon.

40 grams PURAL 400 was suspended in 400 ml deionized water. In a separate beaker, 5.92 grams TEOS was diluted in 30 ml ethanol. While vigorously stirring with a magnetic stir bar the PURAL 400 suspension, the TEOS/ethanol solution was gradually added dripwise. Once the addition was complete, stirring was continued for one half hour. The mixture was then dried by rotary steam evaporation. The resultant material was a sticky gel with a consistency similar to Crisco. Ten grams of this material was treated in air at 1100° C. for 6 hr in a quartz tube furnace, removed, and labeled "4.2 wt % SiO2—$\delta$—AlO2". Routine X-ray diffraction data were collected.

40 grams PURAL 400 was suspended in 400 ml deionized water. In a separate beaker, 7.06 grams TEOS was diluted in 40 ml ethanol. While vigorously stirring with a magnetic stir bar the PURAL 400 suspension, the TEOS/ethanol solution was gradually added dripwise. Once the addition was complete, stirring was continued for one half hour. The mixture was then dried by rotary steam evaporation. The resultant material was a sticky gel with a consistency similar to Crisco. Ten grams of this material was treated in air at 1100° C. for 6 hr in a quartz tube furnace, removed, and labeled "5.6 % SiO2—$\delta$—Al2O3". Another ten grams of this material was treated in 90% air and 10% $H_2O$ at 1100° C. for 6 hr in a quartz tube furnace, removed, and labeled "1100° C. AHTA". Routine X-ray diffraction data were collected.

Figure 3:
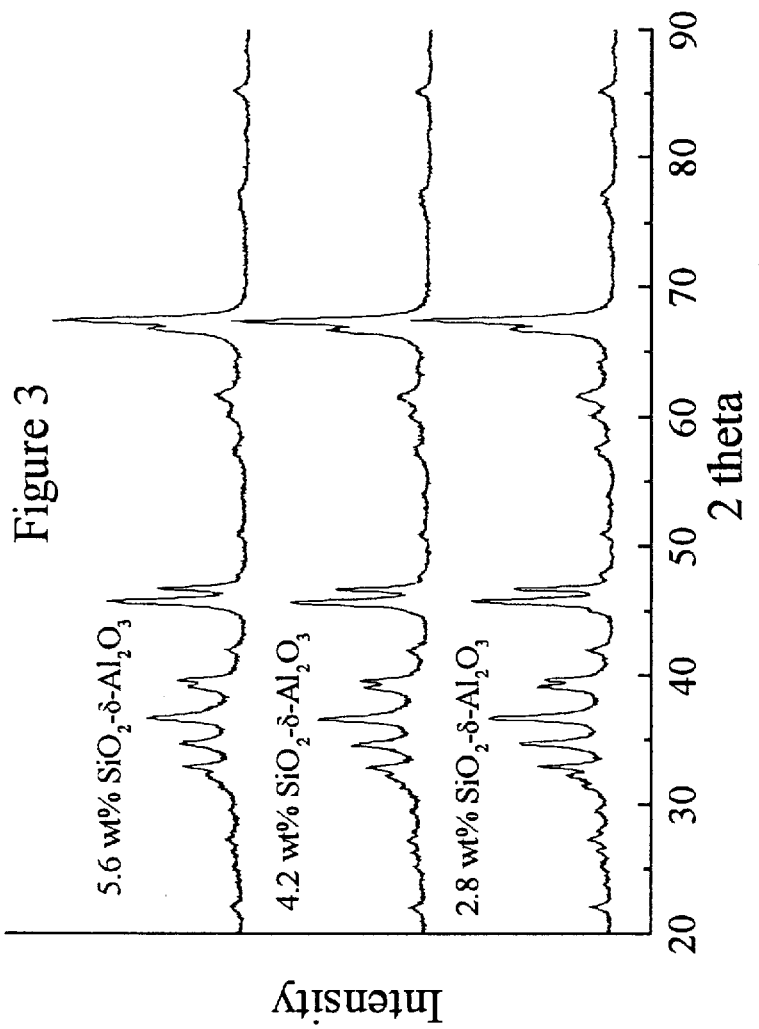
FIG. 3 shows the X-ray diffraction patterns of three silica-stabilized alumina compositions made according to a method of this invention and containing different concentrations of silica.

As the silicon content is increased, so does the phase purity of the resultant $\delta$—$Al_2O_3$ obtained after 1100° C. air treatment. Results are presented in FIG. 3. However, there does appear to be a point at which saturation occurs and the phase purity does not improve. Two materials that nominally contain 9.2% $SiO_2$ yield a crystalline product that appears to contain a discernible amount(that is, more than a trace) of $\theta$—$Al_2O_3$ as the only other crystalline material. Materials with about 5 wt % silicon typically yield essentially phase-pure crystalline $Al_2O_3$. The X-ray diffraction pattern of the material labeled "5.6 % SiO2—$\delta$—AlO2" reveals the presence of what appears to be essentially pure single phase delta alumina (see FIG. 1).

Example 5

Figure 4:
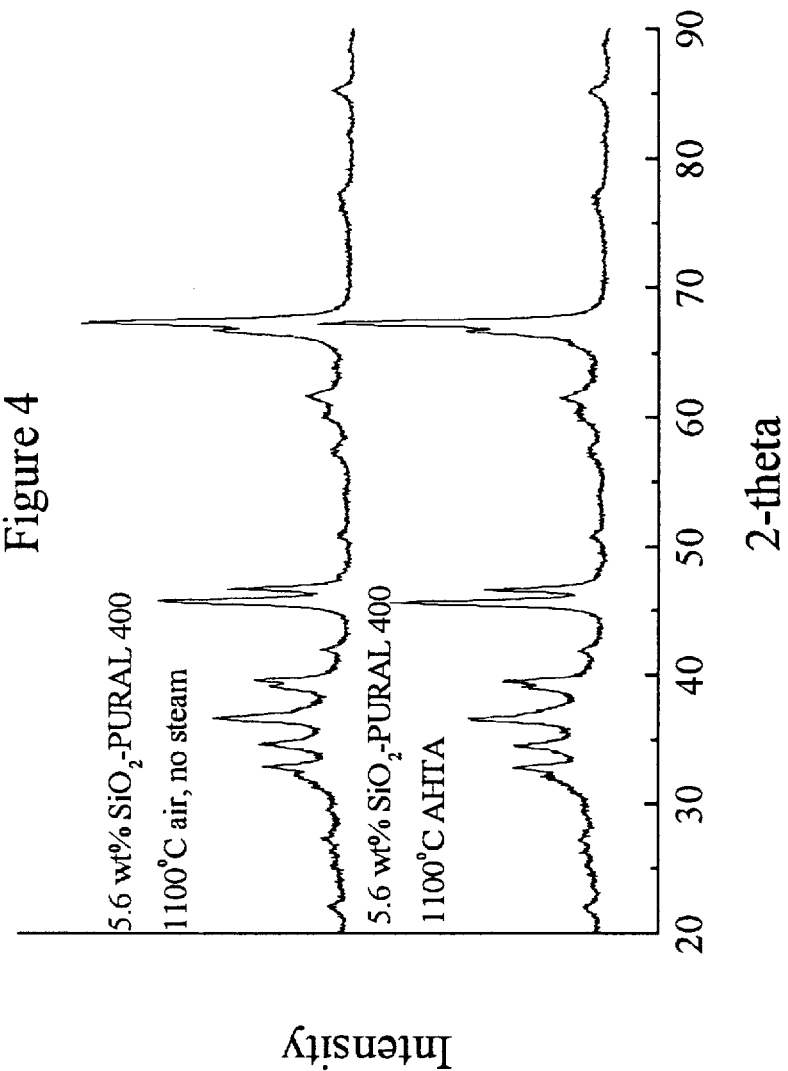
FIG. 4 compares the X-ray diffraction patterns of a silica-stabilized alumina composition that has been hydrothermally treated with a similar material that has been thermally treated.

Steam appears to have stabilized $SiO_2$—$\delta$—$Al_2O_3$ with respect to the $\delta$—$Al_2O_3$ → $\theta$—$Al_2O_3$ phase transition. This was quite surprising since steam is generally thought to promote the high temperature phase evolution of transitional alumina toward $\alpha$—$Al_2O_3$. Careful examination of diffraction patterns of 5.6 wt % $SiO_2$—$\delta$—$Al_2O_3$ that has been treated at 1100° C. either in air or in air with 10% $H_2O$ (see Example 4) reveals the steam-treated material to possess noticeably less $\theta$—$Al_2O_3$. See FIG. 4.

Estimates of the $\theta$—$Al_2O_3$ content can be made by comparison with diffraction patterns of physical mixtures of pure $SiO_2$—$\delta$—$Al_2O_3$ (made by procedure of Example 2) and pure $\theta$—$Al_2O_3$. A material made using flowing air, contains between 5–10% $\theta$—$Al_2O_3$. The physical mixture containing 10% $\theta$—$Al_2O_3$ showed no resolved reflections due to $\theta$—$Al_2O_3$ but a shoulder resulting from $\theta$—$Al_2O_3$ diffraction is visible at about 47° 2$\theta$. The intensity of this shoulder decreases in the 5% $\theta$—$Al_2O_3$—95% $\delta$—$Al_2O_3$. The relative intensity of the sample labeled "5.6 SiO2—$\delta$—AlO2" in the region is intermediate between those observed in the two standard mixtures. The relative intensity in this region observed in the sample labeled "1100° C. AHTA", which was prepared from the same sol/slurry but was treated hydrothermally in 90% air/10% steam at 1100° C., is less than the 5% θ—$Al_2O_3$ standard mixture, showing this material to have greater phase purity than the air-treated material.

An additional experiment tends to confirm this observation. A pair of materials was made using DISPAL 11N7-12 sol, a substantially less crystalline boehmite. According to the vendors, the crystallites in 11N7-12 sol are about 204 Å in diameter while those in PURAL 400 are about 500–600 Å in size. The dried TEOS/DISPAL 11N7-12 material treated in air, 8277-113A2, contains a substantial amount of θ—$Al_2O_3$ (about 50%) while the material treated in 90% air/10% steam (8277-113A3) contains between 10% and 25% θ—$Al_2O_3$. The finding that steam hinders the δ→θ transition in $SiO_2$—δ—$Al_2O_3$ is surprising. It should be noted, however, that the impact of steam treatment is not as significant when stabilizing oxides other than silica are used.

Example 6

160 grams PURAL 400 was suspended in 1600 ml deionized water. In a separate beaker, 28.24 grams TEOS was diluted in 160 ml ethanol. While vigorously stirring with a magnetic stir bar the PURAL 400 suspension, the TEOS/ethanol solution was gradually added dripwise. Once the addition was complete, stirring was continued for one half hour. The mixture was then dried by rotary steam evaporation. The resultant material was a sticky gel with a consistency similar to Crisco. Ten grams of this material was treated in air at 1100° C. for 6 hr in a quartz tube furnace, removed, and labeled sample "5A2". Routine X-ray diffraction data were collected.

1500 grams PURAL 400 was suspended in 15 liters deionized water and stirred with an overhead stirrer. In a separate 4 liter beaker, 265 grams TEOS was diluted in 1.5 liters ethanol. While vigorously stirring the PURAL 400 suspension, the TEOS/ethanol solution was gradually added dripwise. Once the addition was complete, stirring was continued for one half hour. A portion of the slurry was poured into a metal pan; the depth of the slurry was about 0.25". After calcination, this material was labeled sample "5B2". Another portion of the slurry was poured into a ceramic pan. The depth of the slurry in this pan (which eventually resulted in the sample labeled "5C2") was about 0.25". The pans were calcined in a Despatch furnace using the temperature profile: 5° C./min to 150° C. for 2 hr, then ramp at 5° C./min to 600° C., hold for 6 hr, then cool to room temperature. This calcination resulted in 342.1 grams of $SiO_2$—δ—$Al_2O_3$ precursor in the (metal) pan 1 and 290.3 grams of $SiO_2$—δ—$Al_2O_3$ precursor in the (ceramic) pan 2. Ten grams of each material treated in air at 1100° C. for 6 hr in a quartz tube furnace, removed, and labeled as appropriate(samples 5B2 and 5C2). Routine X-ray diffraction data were collected.

Figure 5:
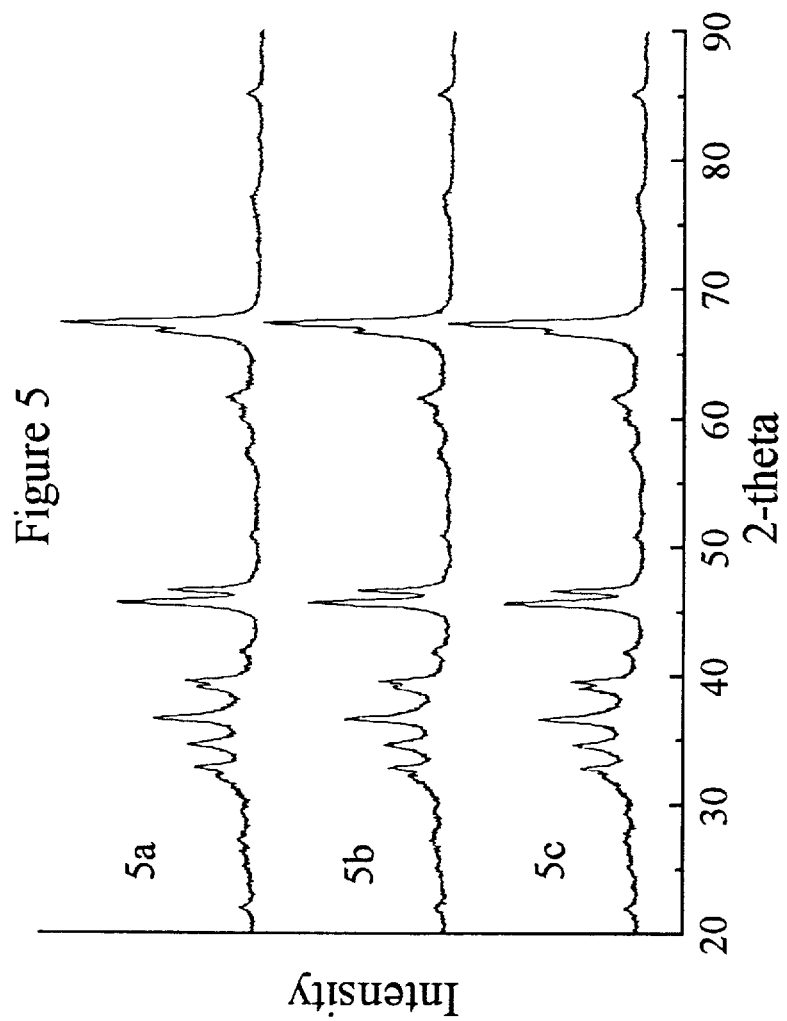
FIGS. 5a, 5b, and 5c compare the X-ray diffraction patterns of silica-stabilized alumina compositions prepared according to this invention but in different lot sizes.

FIG. 5 shows representative results of these scale-up experiments. The first experiment involved a simple 4-fold increase in scale to 160 grams. Rotary drum steam evaporation was still used to drive the suspension. The second experiment was a simple pan preparation where the slurry was dried in a Despatch furnace. All materials were finished at 1100° C. in air in a quartz tube furnace. Each of the three preparations yielded either essentially or completely pure δ—$Al_2O_3$ (with the caveat that "completely pure" δ—$Al_2O_3$ might contain up to about 1–2 percent θ—$Al_2O_3$ that cannot be detected by XRD under data collection conditions utilized). This demonstrated, however, that standard laboratory pan preparation techniques are adequate to achieve the initial solid-liquid separation.

Example 7

Figure 8:
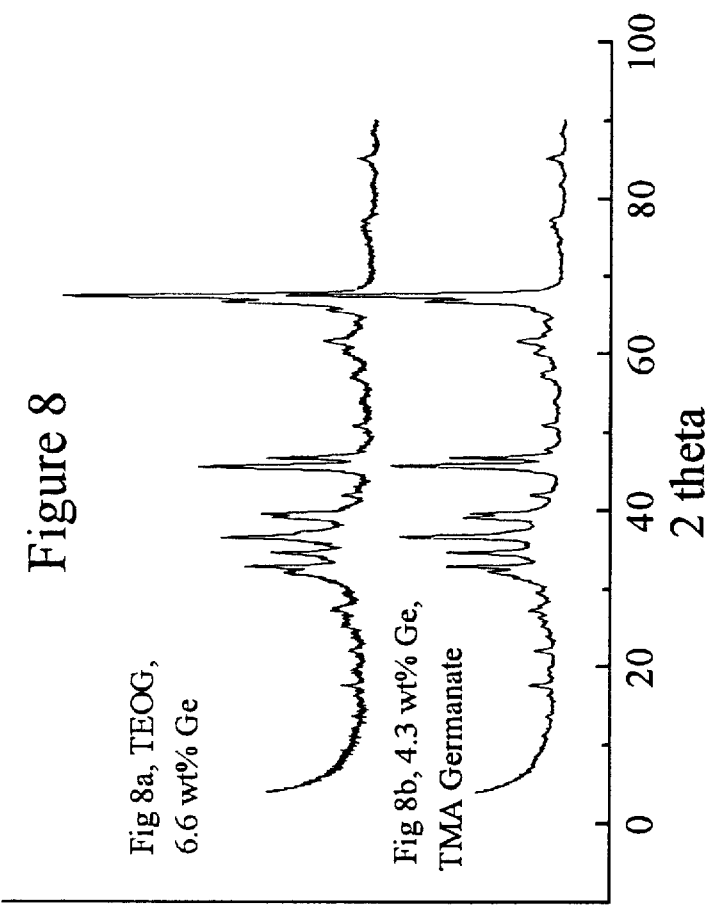
FIG. 8a and 8b show the x-ray diffraction patterns of two different crystalline alumina compositions stabilized by germanium oxide according to this invention.

10 grams of PURAL 400 was suspended in 100 ml deionized water using an overhead stirrer with air motor. 2.14 g germanium(IV) ethoxide (TEOG) was diluted with 10 ml ethanol. With vigorous stirring, the TEOG solution was slowly added to the boehmite suspension. The suspension thickened considerably, but stirring was maintained for about thirty minutes. The suspension was then steam evaporated to dryness, calcined in air to 600° C., the treated at 1100° C. in air for 6 hours. X-ray diffraction analysis, shown in FIG. 8a, revealed an essentially pure-phase crystalline alumina composition that appeared to be delta alumina. The X-ray diffraction reflections of this composition are set forth and compared with the JCPDS δ-alumina in Table 5.

TABLE 5

Germania-Containing and Essentially Pure δ-Alumina X-Ray Diffraction Reflections

| GeO2-δ-Al2O3 | | | δ-Al2O3(JCPDS) | | |
|---|---|---|---|---|---|
| 2θ | d,Å | I/I$_0$ | 2θ | d,Å | I/I$_0$ |
| | absent | | 32.01 | 2.881 | 8 |
| 32.05 | 2.791 | 31 | | absent | |
| 32.80 | 2.729 | 44 | 32.80 | 2.728 | 30 |
| 34.60 | 2.591 | 35 | 34.45 | 2.601 | 25 |
| 36.52 | 2.459 | 51 | 36.48 | 2.460 | 60 |
| 39.04 | 2.306 | 35 | 38.48 | 2.315 | 8 |
| 39.49 | 2.280 | 37 | 39.52 | 2.279 | 40 |
| 41.80 | 2.160 | 14 | 41.77 | 2.160 | 4 |
| 45.46 | 1.994 | 57 | 45.64 | 1.986 | 75 |
| 46.60 | 1.948 | 36 | 46.47 | 1.953 | 40 |
| | absent | | 47.46 | 1.914 | 12 |
| 66.49 | 1.405 | 49 | 66.37 | 1.407 | 50 |
| 67.24 | 1.392 | 100 | 66.99 | 1.396 | 100 |

It should be noted that the d-spaces are consistently larger for the Ge material compared to the Si material (See Table 3). This is consistent with the hypothesis that the stabilizing oxide is incorporated into the crystalline structure, as a dopant.

Example 8

Since it is desirable under some circumstances to make a stabilized δ-alumina in the absence of organic solvents, it was determined that the desired stabilizing oxide may be rendered sufficiently water-soluble by dissolving the oxide first in an aqueous solution of a non-volatile base that leaves no residue after calcination, such as tetra alkyl ammonium hydroxide. This example demonstrates that such reagents make highly effective stabilizing oxide precursors for use in the methods of this invention.

31 grams of 25 wt % tetramethylammonium hydroxide (SACHEM) was diluted, in a polyethylene bottle, with 100 grams deionized water. Then 8.5 grams 99.99% pure $GeO_2$ was added. The germania dissolved in less than one hour, giving a colorless solution. This yields a 4.2 wt % Ge solution formulated as $[N(CH_3)_4]_2[Ge(OH)_6]$. 20 grams of this solution was diluted with 80 grams deionized water and placed into a waring blender. 20 grams of PURAL 400 boehmite was added and the suspension was blended for one to two minutes. The material was then transferred to a calcination dish and calcined for 2 hr at 150° C. and then for 6 hr at 600° C. The material was then sized to 20–40 mesh.

One gram of material finer than 40 mesh was treated in air at 1100° C. for 6 hr. X-Ray diffraction analysis(see FIG. 8*b*) reveals the presence of an essentially single phase crystalline composition that appears to be pure delta alumina with possibly a very small amount of theta alumina interspersed throughout.

Example 9

This example and the two that follow illustrate the preparation of δ-alumina compositions of the present invention that have been stabilized using a combination of oxides.

Figure 6:
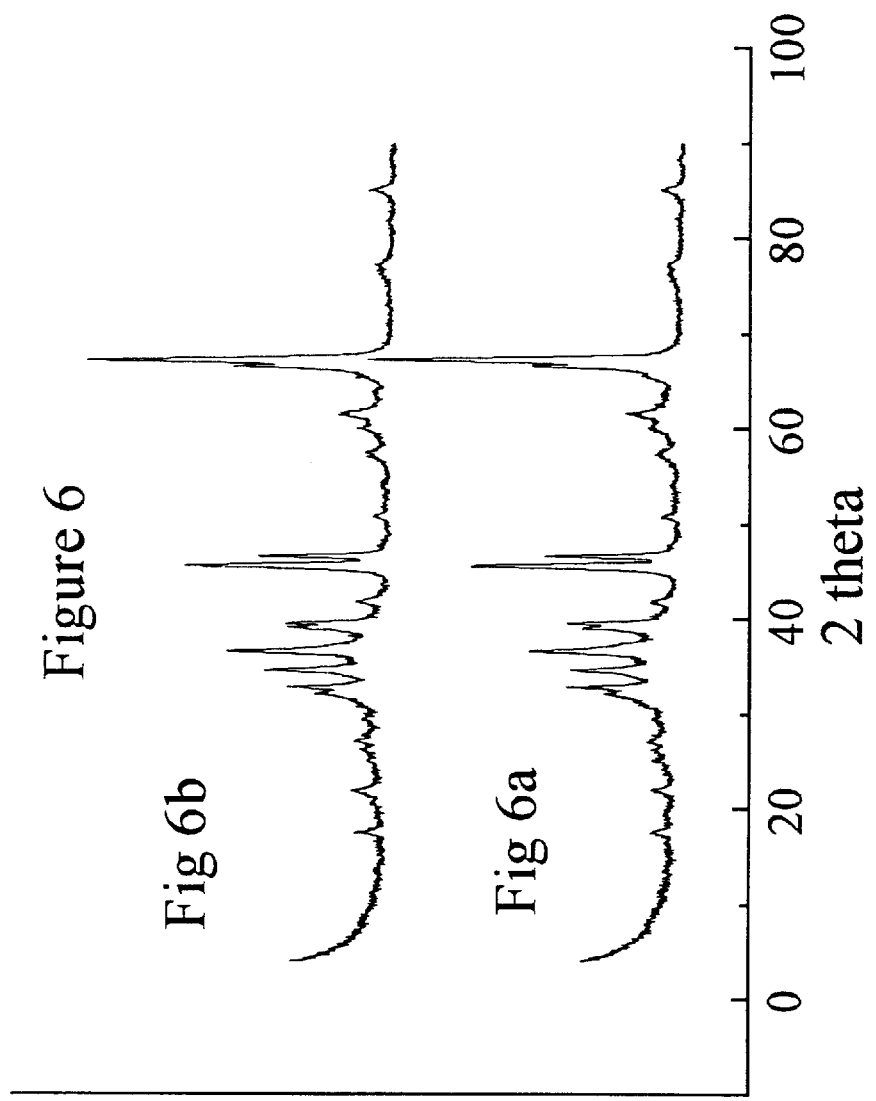
FIG. 6a shows the X-ray diffraction pattern of a crystalline alumina composition stabilized according to this invention by a combination of oxides of Si and Ge.
FIG. 6b shows the X-ray diffraction pattern of a crystalline alumina composition stabilized according to this invention by a combination of oxides of Ge and P.

10 grams of PURAL 400 boehmite was suspended in 100 ml of de-ionized water. In a separate beaker, 0.88 grams of TEOS and 1.07 grams of Ge(IV) ethoxide (TEOG) were diluted with 10 ml of ethanol. While vigorously stirring the PURAL 400 suspension with a magnetic stir bar, the TEOS/TEOG/ethanol solution was gradually added dripwise. Once the addition was complete, stirring was continued for 30 minutes. The mixture was then mildly dried by rotary drum steam evaporation with the steam temperature at about 100° C. It was then calcined, initially at 150° C. for 2 hours, followed by 6 hours at 1100° C. The calcined material was transferred to a quartz tube furnace and hydrothermally treated in an air atmosphere containing 10% steam for 6 hours. Chemical analysis revealed a silicon content of 1.28 wt. % and a germanium content of 2.91 wt. %. The X-ray diffraction pattern, shown in FIG. 6*a,* reveals the presence of essentially pure δ-alumina.

Example 10

Figure 7:
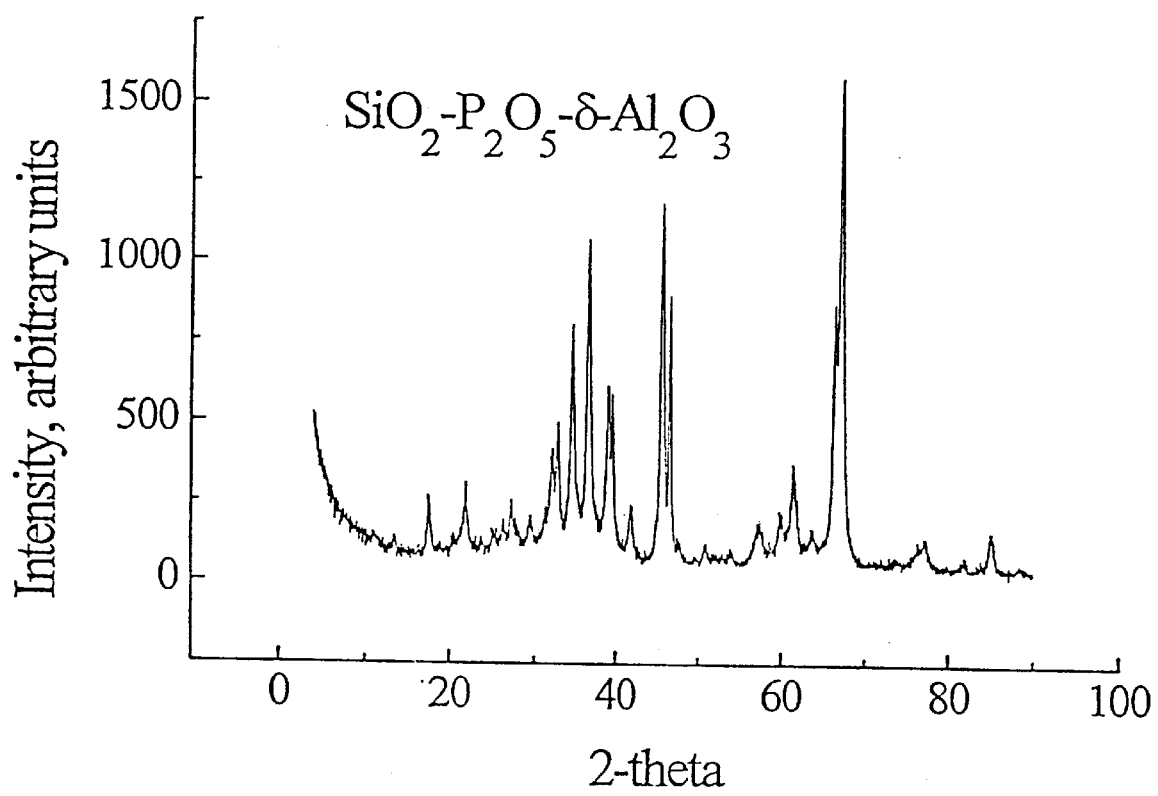
FIG. 7 shows the X-ray diffraction pattern of a crystalline alumina composition stabilized according to this invention by a combination of oxides of Si and P.

40 grams of PURAL 400 boehmite was suspended in 200 ml of de-ionized water. In a separate beaker, 3.53 grams of TEOS were diluted with 20 ml of ethanol. In a third beaker, 2.24 grams of ammonium hydrogen phosphate, $[NH_4]_2[HPO_4]$, was dissolved in 20 ml of de-ionized water. While vigorously stirring the PURAL 400 suspension with a magnetic stir bar, the two stabilizer solutions were simultaneously added dripwise. Once the addition was complete, stirring was continued for 30 minutes. The mixture was then dried by rotary steam evaporation, and calcined, initially at 150° C. for 2 hours, followed by 6 hours at 1100° C. The material was then transferred to a quartz tube furnace and hydrothermally treated in an air atmosphere containing 10% steam for 6 hours. Chemical analysis revealed a silicon content of 0.28 wt. % and a phosphorus content of 1.13 wt. %. The X-ray diffraction pattern, shown in FIG. 7, reveals the presence of essentially pure δ-alumina.

Example 11

10 grams of PURAL 400 boehmite was suspended in 100 ml of de-ionized water. In a separate beaker, 1.07 grams of TEOG were diluted with 5 ml of ethanol. In a third beaker, 0.56 grams of ammonium hydrogen phosphate, $[NH_4]_2[HPO_4]$, was dissolved in 5 ml of de-ionized water. While vigorously stirring bar the PURAL 400 suspension with a magnetic stir, the two stabilizer solutions were simultaneously added dripwise. Once the addition was complete, stirring was continued for 30 minutes. The mixture was then dried by rotary steam evaporation, and calcined, initially at 150° C. for 2 hours, followed by 6 hours at 1100° C. The material was then transferred to a quartz tube furnace and hydrothermally treated in an air atmosphere containing 10% steam for 6 hours. Chemical analysis revealed a germanium content of 3.06 wt. % and a phosphorus content of 1.30 wt. %. The X-ray diffraction pattern, shown in FIG. 6*b,* reveals the presence of essentially pure δ-alumina.

Example 12

This example and the one that follows demonstrate that a minimum of about 1 wt. % phosphorus is required in a stabilized δ-alumina composition of the present invention in order to avoid significant transition to θ-alumina.

Figure 9:
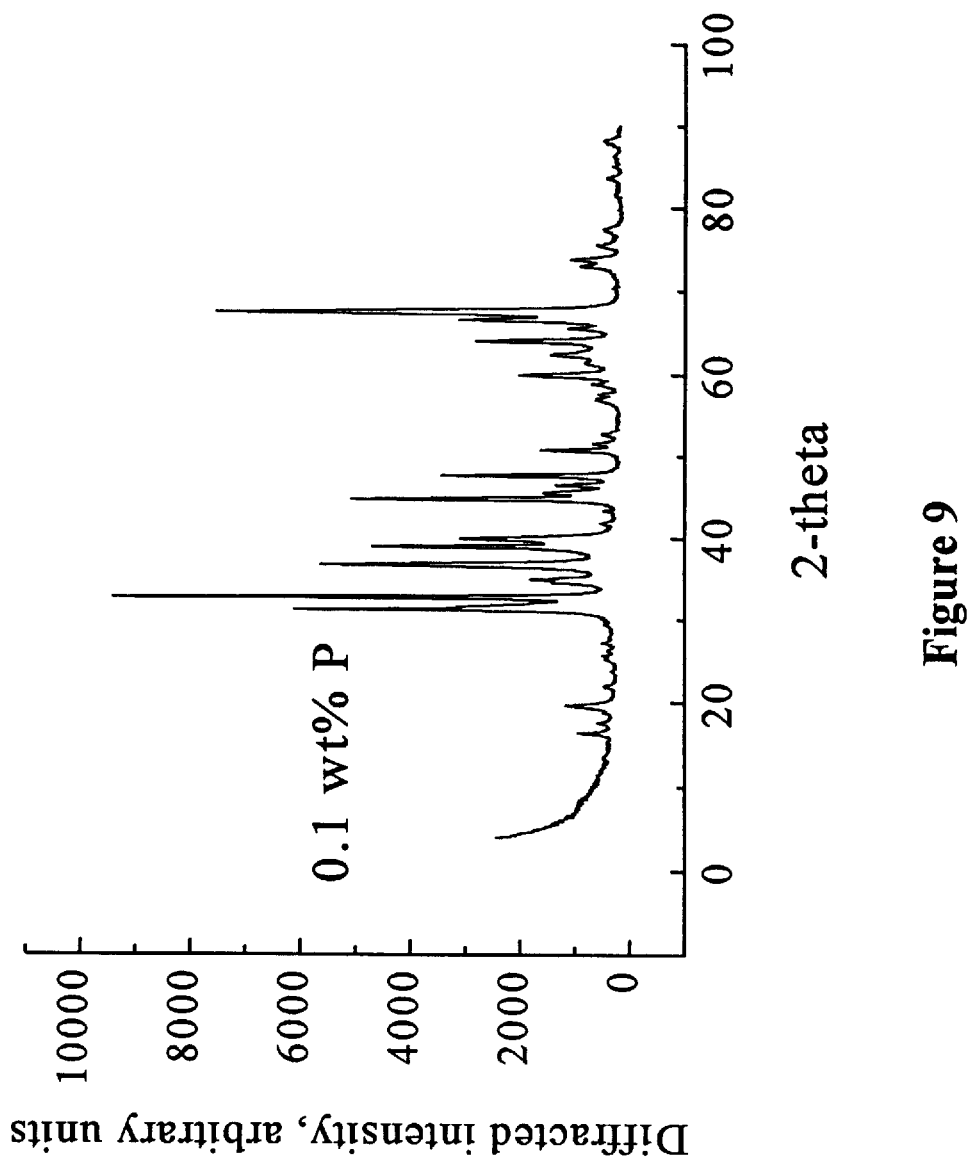
FIGS. 9–11 show the X-ray diffraction patterns of alumina compositions stabilized by 0.1 wt. % P, 0.5 wt. % P, and 1.0 wt. % P, respectively.

A suspension containing 600 grams of PURAL 400 and 1.97 grams of ammonium dihydrogen phosphate in 1900 ml of de-ionized water was prepared and stirred vigorously for 30 minutes. The preparation was completed using the same calcining and hydrothermal treating procedure employed in Example 3, and a more rapid drying procedure using a hotter rotary drum dryer. Rapid drying is important when using phosphorus materials in order to suppress subsequent formation of $AlPO_4$ phases. The procedure yielded an alumina composition containing 0.1 wt. % P. The X-ray diffraction pattern, shown in FIG. 9, reveals that the major phase is θ-alumina and the minor phase is δ-alumina. The maxima in diffracted intensity at 44.86° and 47.70° 2θ are indicative of θ-alumina, while the weaker reflections at 45.58° and 46.51° are indicative of δ-alumina. Too little phosphorus is present in this sample to stabilize δ-alumina effectively at 1100° C.

Figure 10:
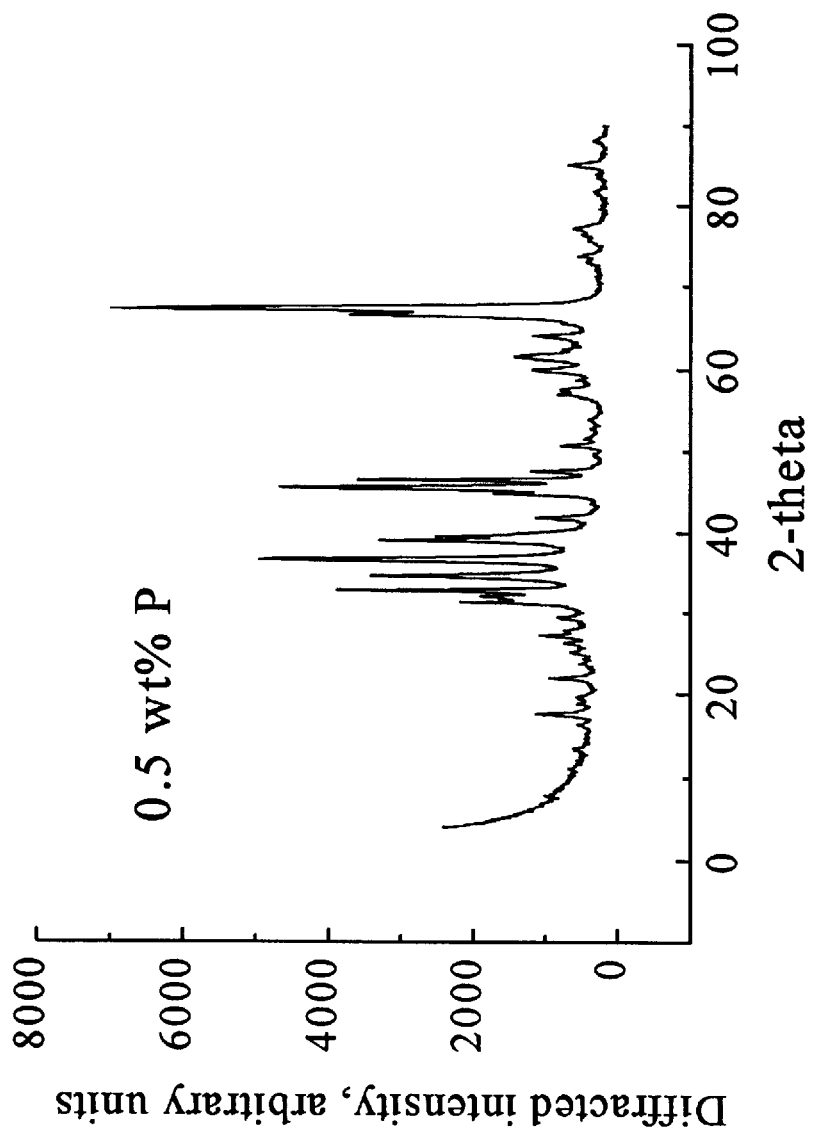

A sample containing 0.5 wt. % P was prepared in the same manner as above, except that 9.71 grams of ammonium dihydrogen phosphate and 2100 ml of de-ionized water were used. The X-ray diffraction pattern, shown in FIG. 10, reveals a mixed-phase sample which contains considerably more δ-alumina than θ-alumina, as shown by the four peaks between 40–50° 2θ, with the "inner" reflections due to δ-alumina having greater intensity than the "outer" reflections of θ-alumina. Consistent with these data, the reflection at 31.30° 2θ is due to θ-alumina and its presence is a distinguishing feature of crystalline transitional aluminas containing substantial amounts of both phases.

Example 13

Figure 11:
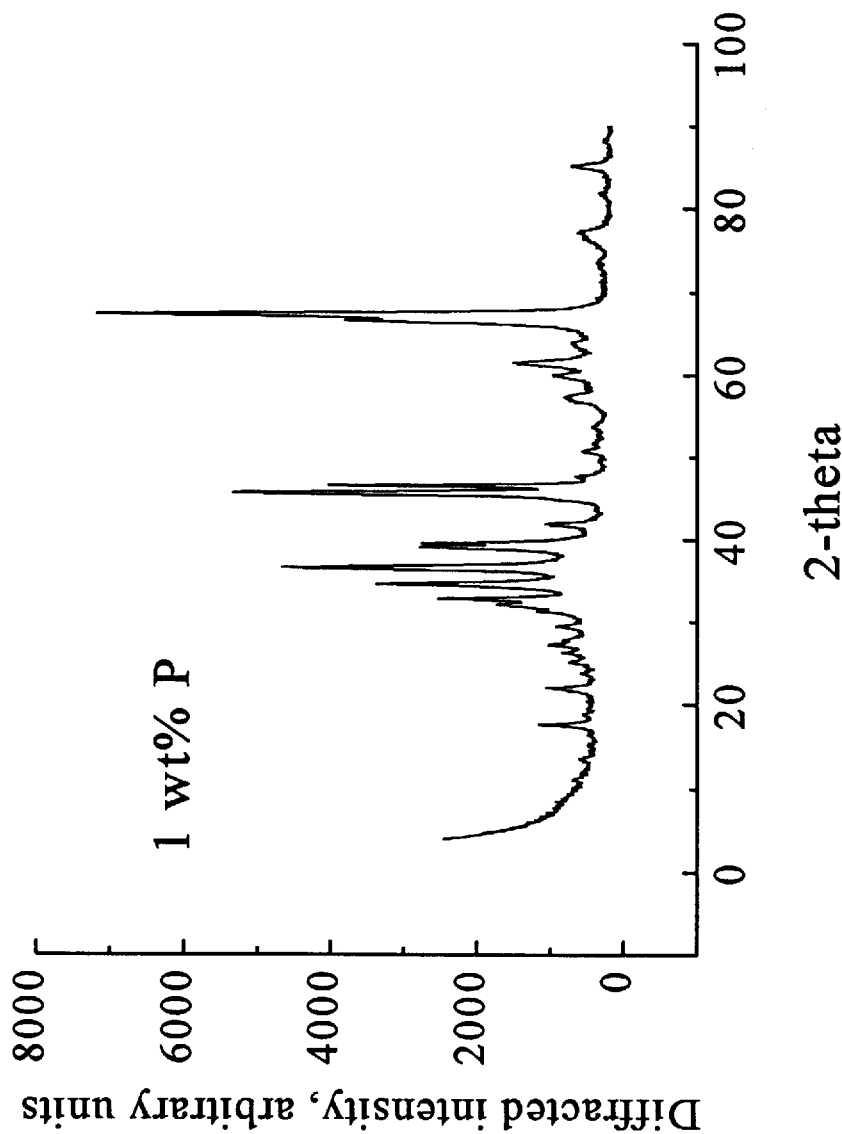

A sample containing 1.0 wt. % P was prepared in the same manner as in Example 11, except that 19.21 grams of ammonium dihydrogen phosphate and 2300 ml of de-ionized water were used. The X-ray diffraction pattern, shown in FIG. 11, reveals a diffraction pattern that is essentially phase-pure δ-alumina, with only a small amount of θ-alumina being detectable. From these three examples, it is possible to estimate the lower limit on the concentration of phosphorus required to stabilize a δ-alumina composition of the present invention to be about 1 wt. %.

Example 14

Since at least 1 wt % of Si or P is required to stabilize delta alumina, we sought to determine whether a small amount of both stabilizers would result in formation of essentially phase-pure delta alumina after 1100° C. treatment.

600 grams PURAL 400 was dispersed into 1000 grams of deionized water. 54 grams of tetramethylammonium silicate (SACHEM) was added to this suspension. The suspension gelled. Therefore 200 grams additional deionized water was added. In a separate beaker, 9.71 grams of ammonium dihydrogen phosphate was dissolved in 150 grams deionized water. This phosphate solution was added to the tetramethylammonium silicate-PURAL 400 suspension. The suspension gelled again, so 1200 grams deionized water was added. Then the mixture was stirred for 30 minutes to achieve good homogeneity. The material was then dried using a rotary drum dryer and calcined in a box furnace to 1100° C. for 6 hr. X-Ray diffraction analysis reveals the presence of an essentially single phase crystalline alumina composition appearing to have the X-ray diffraction characteristics of substantially pure delta alumina with a very small amount (i.e. less than about 3% by 6 wt.) of theta alumina present. The X-ray diffraction reflection values are set forth in Table 6, below.

TABLE 6

X-Ray Diffraction Reflections of Essentially
Pure δ-Alumina Stablized with P/Si
$P_2O_5$—$SiO_2$-δ-$Al_2O_3$

| | |
|---|---|
| 2.780 | 23 |
| 2.723 | 31 |
| 2.592 | 42 |
| 2.450 | 62 |
| 2.30 | 34 |
| 2.273 | 35 |
| 2.158 | 14 |
| 1.981 | 73 |
| 1.948 | 55 |
| 1.402 | 51 |
| 1.391 | 100 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A crystalline alumina composition comprising:

about 85 wt. % to about 99 wt. % alumina;

about 1 wt. % to about 15 wt. % modifying stabilizer selected from the group consisting of the oxides of germanium (Ge), silicon (Si), phosphorus (P), arsenic (As), and mixtures thereof; and wherein said composition is substantially phase-pure and is thermally and hydrothermally phase-stable at temperatures up to about 1250° C. and has a characteristic X-ray diffraction pattern which contains at least the following d-spacings and relative intensities:

| d, Å | $I/I_0$, % |
|---|---|
| 2.770–2.795 | 15–49 |
| 2.712–2.738 | 15–49 |
| 2.580–2.608 | 14–49 |
| 2.440–2.467 | 31–84 |
| 2.295–2.315 | 15–49 |
| 2.268–2.290 | 15–49 |
| 2.148–2.162 | 0–14 |
| 1.979–1.996 | 50–84 |
| 1.941–1.950 | 31–49 |
| 1.400–1.407 | 50–84 |
| 1.388–1.394 | 85–100 | and does not contain a resolved reflection centered at d=1.914 Å or 2.881 Å.

2. The alumina composition of claim 1 wherein the modifying stabilizer is silicon dioxide and comprises from about 1.75 wt. % to about 10 wt. % of said composition.

3. The alumina composition of claim 1 wherein the modifying stabilizer is germanium dioxide and comprises from about 1.75 wt. % to about 15 wt. % of said composition.

4. The alumina composition of claim 1 wherein the modifying stabilizer is phosphorus pentoxide and comprises from about 1 wt. % to about 10 wt. % of said composition.

5. The alumina composition of claim 1 wherein the modifying stabilizer is arsenic pentoxide and comprises from about 1 wt. % to about 15 wt. % of said composition.

6. The alumina composition of claim 1 wherein the modifying stabilizer is a mixture of silicon dioxide and germanium dioxide, with the amount of silicon dioxide constituting from about 0.05 wt. % to about 5.0 wt. % and the amount of germanium dioxide constituting from about 0.1 wt. % to about 10 wt. % of the total composition.

7. The alumina composition of claim 1 wherein the modifying stabilizer is a mixture of silicon dioxide and phosphorus pentoxide with the amount of silicon dioxide constituting from about 0.05 wt. % to about 5.0 wt. % and the amount of phosphorus pentoxide constituting from about 0.1 wt. % to about 5.0 wt. % of the total composition.

8. The alumina composition of claim 1 wherein the modifying stabilizer is a mixture of germanium dioxide and phosphorus pentoxide with the amount of germanium dioxide constituting from about 0.1 wt. % to about 10 wt. % and the amount of phosphorus pentoxide constituting from about 0.1 wt. % to about 5.0 wt. % of the total composition.

\* \* \* \* \*